UNITED STATES PATENT OFFICE.

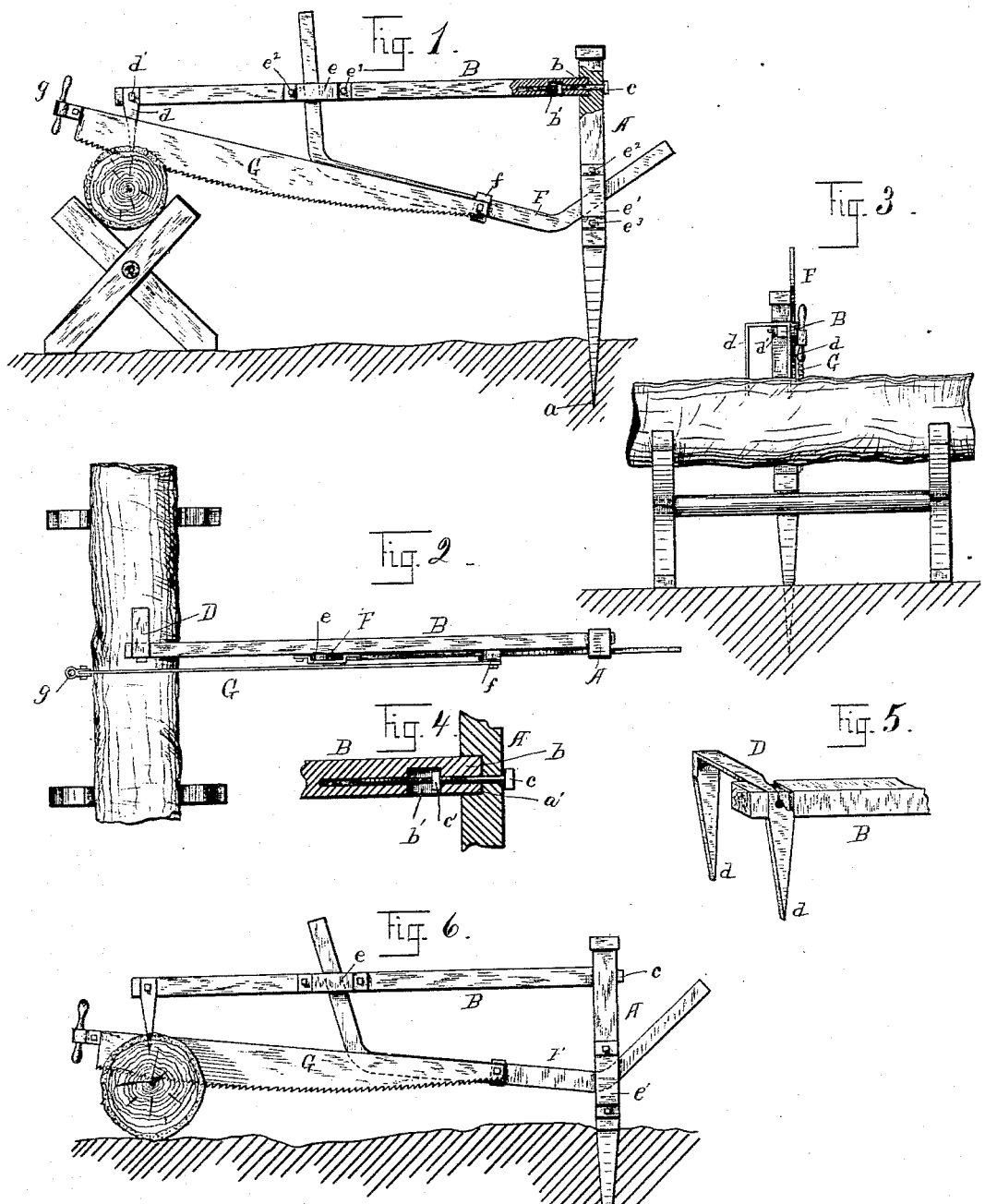

JAMES S. HENDRICKSON, OF OLMSTED, OHIO.

SAWING APPARATUS.

SPECIFICATION forming part of Letters Patent No. 388,039, dated August 21, 1888.

Application filed November 21, 1887. Serial No. 255,779. (No model.)

*To all whom it may concern:*

Be it known that I, JAMES S. HENDRICKSON, a citizen of the United States, and a resident of Olmsted, county of Cuyahoga, and State of Ohio, have invented certain new and useful Improvements in Sawing Apparatus, of which the following is a specification, the principle of the invention being herein explained and the best mode in which I have contemplated applying that principle, so as to distinguish it from other inventions.

My invention has for its object an improved form of apparatus for sawing logs and other heavy timber.

Referring to the drawings, Figure 1 is a side elevation view of a sawing apparatus, certain parts being broken away and in section. Fig. 2 is a plan view of the same. Fig. 3 is an end elevation view of the same. Fig. 4 is a detail in section of a portion of the arm and post. Fig. 5 is a perspective view in detail of one end of the arm holding the prongs. Fig. 6 is a side elevation of the apparatus in lowered position.

A is an upright post having a sharpened point, $a$, which may be driven into the ground to any required depth. Said post is provided at its upper end with the mortise $a'$, in which is inserted the end $b$ of the horizontal brace-bar B, provided near its point of insertion with the mortise $b'$. Bolt $c$ passes through post A into brace B, to which it is secured by nut $c'$, located in said mortise. The opposite or freed end of said brace B is provided with a dog, D, with double points $d$, made of one piece of metal and bent, as shown in Fig. 6, set flush with the wood, and secured to the same by bolt $d'$. Near their respective longitudinal centers the post A and bar B are provided with sleeves, respectively, $e$ $e'$, through which passes the angular brace F, which is held in adjustment by drawing up the respective bolts $e^2$ $e^3$, which draw the sleeves into closer contact with their respective supports and tightly hold said brace against the post and brace B. On brace F is secured sliding sleeve $f$, to which is pivoted one end of the saw G, its other end provided with handle $g$, centrally secured thereto, that said handle may be grasped by the operator either above or below the saw.

Where the log to be sawed is placed on a saw-buck, as shown in Fig. 1, it is not necessary to drive the point of the post into the ground very deeply; but when it is desired to saw the log when the latter is resting on the ground, as shown in Fig. 6, I embed the post deeply, that the height of the braces B and F may correspond with the height of the saw and log.

The operation is easily understood. Suppose the log to be operated upon is on the ground, as shown in Fig. 6. The post A is driven into the ground until the points $d$ of the dog D are ready to pierce the log, said points being driven into the log by a blow of the ax to steady it. The brace F is then set low enough to permit the sleeve $f$ to have easy movement thereon when the saw is reciprocated by the operator, who grasps the upper handle, $g$, as more convenient, the lower handle being shorter or flush with the teeth of the saw that it may not strike in the ground or in any way hinder the progress of the saw when in operation.

The foregoing description and accompanying drawings set forth in detail mechanism in embodiment of my invention. Change may, therefore, be made therein, provided the principles of construction respectively recited in the following claims are retained and employed.

I therefore particularly point out and distinctly claim as my invention—

1. The combination of a post, a brace-bar substantially horizontal, an angle-bar engaging with each, and a saw having sliding bearing on said angle-bar, substantially as set forth.

2. The combination of a post, a horizontal brace-bar engaging with the material to be cut, an angle-bar movably secured to said post and bar, and a saw having sliding bearing on said angle-bar, substantially as set forth.

3. The combination of a post secured vertically in the earth, a brace-bar secured to said post and engaging with the material to be cut, an angle-bar having a straight central portion and an angular end portion, said angle-bar engaging with said post and brace, and a saw having sliding bearing on said angle-bar, substantially as set forth.

4. The combination of post A, provided with sleeve $e'$, horizontal brace-bar B, having its one extremity secured to said post and its opposite extremity engaging with the material to be cut, said bar provided with a sleeve, an angle-bar fitting in said sleeve, and a saw having sliding bearing on said angle-bar, substantially as set forth.

5. The combination of post A, provided with a sharp lower extremity and having sleeve $e'$, horizontal brace-bar B, having its one extremity secured to said post and its opposite extremity provided with dog $d$, said bar also provided with sleeve $e$, angle-bar F, provided with loosely-fitting sleeve $f$, said angle-bar having its extremities fitting in sleeves $e\ e'$, and saw G, pivoted at one extremity to said sleeve $f$, substantially as set forth.

6. The combination of post A, provided with a sharpened lower extremity and provided near its upper end with mortise $a'$, brace-bar B, having extremity $b$ fitting in said mortise and provided near said extremity with mortise $b'$, bolt $c$, passing through said post and extremity into said mortise, said bar B having secured to its opposite extremity the double-pointed dog $d$, said bar and brace having, respectively, sleeves $e\ e'$, angle-bar F, having a right-line central portion and angular end portions, the latter fitting, respectively, in said sleeves, sleeve $f$, having loose sliding bearing on the right-line central portion of said angle-bar, and saw G, pivoted to said sleeve $f$, substantially as set forth.

In testimony that I claim the foregoing to be my invention I have hereunto set my hand this 19th day of November, A. D., 1887.

JAMES S. HENDRICKSON.

Witnesses:
J. B. FAY,
C. B. NASH.